United States Patent
Wyatt et al.

(10) Patent No.: US 8,963,935 B1
(45) Date of Patent: Feb. 24, 2015

(54) METHOD AND SYSTEM FOR ACCESSING DISPLAY CONFIGURATION INFORMATION IN A MULTI-GPU SYSTEM USING HOT-PLUG DETECTION SIGNALS

(75) Inventors: David Wyatt, San Jose, CA (US); Ludger Mimberg, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1546 days.

(21) Appl. No.: 12/104,398

(22) Filed: Apr. 16, 2008

(51) Int. Cl.
*G09G 5/39* (2006.01)

(52) U.S. Cl.
USPC .......................................................... 345/531

(58) Field of Classification Search
USPC .......................................................... 345/502
See application file for complete search history.

(56) References Cited

U.S. PATENT DOCUMENTS

| | | |
|---|---|---|
| 6,903,706 B1 | 6/2005 | Trottier et al. |
| 7,123,248 B1 * | 10/2006 | Lafleur ........................ 345/204 |
| 2005/0083247 A1 * | 4/2005 | Juenger ........................ 345/2.2 |
| 2005/0285865 A1 * | 12/2005 | Diamond ...................... 345/520 |
| 2007/0046697 A1 * | 3/2007 | Hussain ....................... 345/649 |
| 2007/0283175 A1 * | 12/2007 | Marinkovic et al. .......... 713/320 |
| 2008/0034238 A1 * | 2/2008 | Hendry et al. ................ 713/323 |
| 2008/0084359 A1 * | 4/2008 | Giannuzzi et al. ............. 345/1.1 |

OTHER PUBLICATIONS

Office Action in U.S. Appl. No. 12/104,393, mailed Apr. 11, 2011.
Office Action in U.S. Appl. No. 12/104,400, mailed Apr. 15, 2011.
I2C-Bus Specification, Version 2.1, Jan. 2000, published by Philips Semiconductors, pp. 1-46.
Final Office Action, U.S. Appl. No. 12/104,400 dated Sep. 13, 2011.

* cited by examiner

*Primary Examiner* — Edward Martello
(74) *Attorney, Agent, or Firm* — Patterson & Sheridan, LLP

(57) ABSTRACT

One embodiment of the present invention sets forth a method for accessing display configuration information of a display device in a multi-graphics-processing-unit (multi-GPU) system based on a hot-plug detection signal associated with the same display device. The method includes the steps of changing the power state of a discrete GPU (dGPU) in the multi-GPU coupled to the display device after having detected an assertion of the hot-plug detection signal, retrieving the display configuration information of the display device with the dGPU, and powering down the dGPU after having retrieved the display configuration information.

21 Claims, 5 Drawing Sheets

METHOD AND SYSTEM FOR ACCESSING DISPLAY CONFIGURATION INFORMATION IN A MULTI-GPU SYSTEM USING HOT-PLUG DETECTION SIGNALS

BACKGROUND OF THE INVENTION

1. Field of the Invention

Embodiments of the present invention relate generally to multi-GPU systems and more specifically to a method and system for accessing display configuration information in a multi-GPU system using hot-plug detection signals.

2. Description of the Related Art

Unless otherwise indicated herein, the approaches described in this section are not prior art to the claims in this application and are not admitted to be prior art by inclusion in this section.

To satisfy users' continued demands for graphics applications that offer rich visual effects and interactive features, various multi-graphics-processing-unit (multi-GPU) solutions have been proposed to handle the computationally-intensive operations that are needed in such graphics applications. One solution is to supplement the integrated graphics subsystem of a main computing system with an enhanced graphics subsystem. So, the main computing system can make use of the enhanced graphics subsystem to perform all rendering or assist in accelerating rendering and even drive the processed data in the frame buffer of the enhanced graphics subsystem to a display device attached to the enhanced graphics subsystem. Such a display device is herein referred to as an "add-on display device" and is often the preferred display device for the multi-GPU system, because it supports different technologies that address some of the shortcomings in the older analog display devices. Also, the GPU in the integrated graphics subsystem is herein referred to as the motherboard GPU (mGPU), and the GPU in the enhanced graphics subsystem is referred to as the discrete GPU (dGPU).

However, there currently lacks a mechanism to seamlessly transition between the integrated graphics subsystem and the enhanced graphics subsystem. In particular, in a conventional multi-GPU solution, switching between these two subsystems requires a cumbersome process of rebooting and also re-enumerating the various display devices that are attached to the two graphics subsystems. Furthermore, the dGPU in the enhanced graphics subsystem is sometimes powered-down in the conventional multi-GPU solution to reduce power consumption. During this power-down period in which the dGPU is unavailable, the add-on display device also becomes inaccessible. In other words, the current multi-GPU solution is unable to detect hot-plug events (e.g., attachment or detachment of the add-on display device) or receive any specification data associated with the add-on display device via the Display Data Channel or an auxiliary channel (collectively, DDC/AUX) while the dGPU is turned-off, further complicating the process of switching between the two graphics subsystems.

As the foregoing illustrates, what is needed is an improved way of accessing the add-on display device without significantly modifying hardware and software configurations of a multi-GPU system to enable the seamless transitions between the various graphics subsystems in such a multi-GPU system and address at least the problems set forth above.

SUMMARY OF THE INVENTION

A method and system for accessing display configuration information in a multi-graphics-processing-unit (multi-GPU) system using hot-plug detection signals are disclosed. Specifically, one embodiment of the present invention sets forth a method, which includes the steps of changing the power state of a discrete GPU (dGPU) in the multi-GPU, with which the display device is coupled to, after having detected an assertion of the hot-plug detection signal, retrieving the display configuration information of the display device with the dGPU, and powering down the dGPU after having retrieved the display configuration information.

At least one advantage of the present invention disclosed herein is to permit accesses to the display configuration information of a display device normally owned by a dGPU without having to significantly modify hardware and software configurations of a multi-GPU system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the drawings. It is to be noted, however, that the drawings illustrate only typical embodiments of this invention and are therefore not to be considered limiting of its scope, for the invention may admit to other equally effective embodiments.

DETAILED DESCRIPTION

Figure 1:
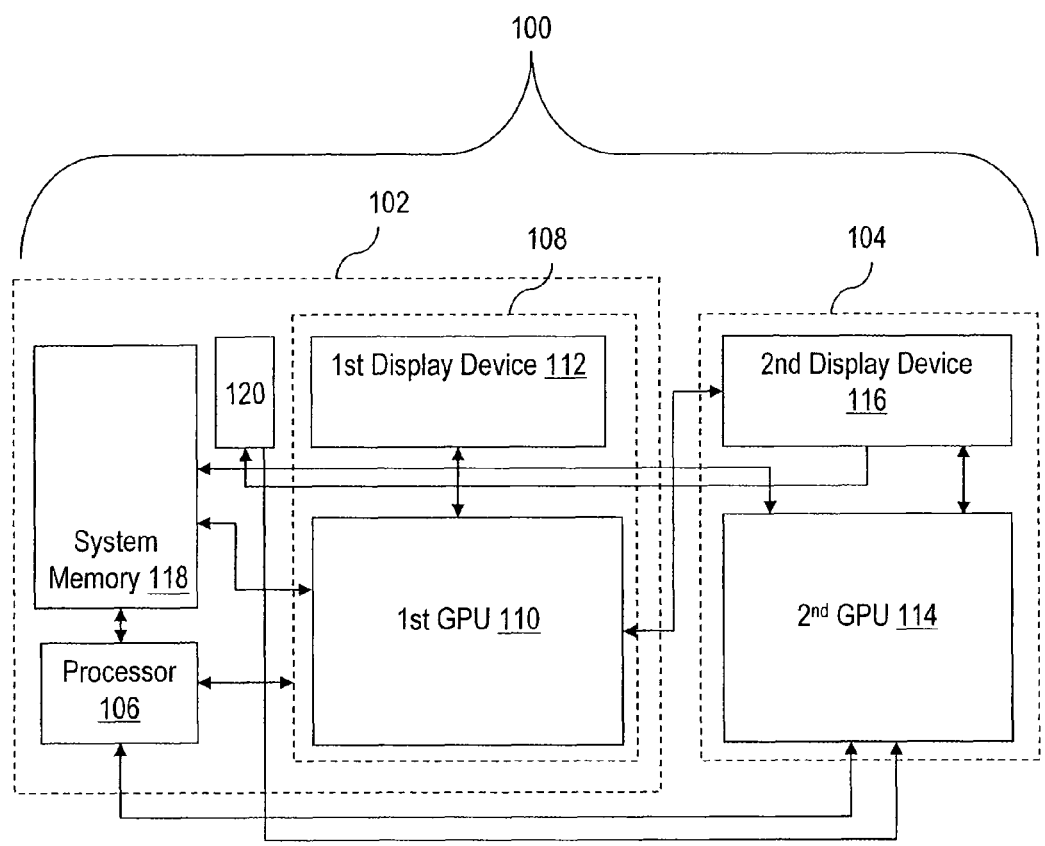
FIG. 1 is a simplified block diagram illustrating some components in a multi-GPU system that enables seamless access to a display device attached to a discrete GPU, according to one embodiment of the present invention.

FIG. 1 is a simplified block diagram illustrating some components in a multi-GPU system 100 that enables seamless access to a display device attached to a discrete GPU (dGPU), according to one embodiment of the present invention. Here, the dGPU corresponds to a second GPU 114, and a first GPU 110 is referred to as a motherboard GPU (mGPU). It is worth noting that by gaining access to the second display device 116, even if the second GPU 114 is unavailable, the multi-GPU system 100 is then able to support seamless switching (e.g., via hot-key switching or some other user interfaces) among the various display devices that are directly or indirectly coupled to it. More precisely, by utilizing only the hot-plug detection signal associated with a display device that is owned by the second GPU 114, such as the illustrated second display device 116, the multi-GPU system 100 is configured to enumerate and validate the capabilities of this display device prior to making the display device available to be selected.

The multi-GPU system 100 includes a host computer 102 and a second graphics subsystem 104 (also referred to as an enhanced graphics system). The host computer 102 includes a processor 106 and a first graphics subsystem 108 (also referred to as the integrated graphics system). The first graphics subsystem 108 further includes a first GPU 110 and a first display device 112. The second graphics system 104 includes a second GPU 114 and a second display device 116. The host computer 102 also includes an embedded controller 120, either as a standalone embedded controller or a system embedded controller, which receives hot-plug detection signals associated with the second display device 116 via its general purpose input/output (GPIO) port. Subsequent paragraphs further detail how the embedded controller 120 and the multi-GPU system 100 make use of the received hot-plug detection signals.

The host computer 102 further includes a system memory 118, which stores programming instructions and data for the processor 106 to execute and operate on. In one implementation, these programming instructions are for a hybrid driver, a first graphics driver for the first GPU 110, and a second graphics driver for the second GPU 114. These software components are further detailed in subsequent paragraphs. In other implementations, the processor 106, the first GPU 110, a chipset (not shown), or any combination thereof, may be integrated into a single processing unit. Further, the functionality of the first GPU 110 may be included in the chipset or in some other type of special purpose processing unit or co-processor. In such embodiments, the programming instructions may reside in memory systems other than the system memory 118 and may be executed by processing units other than the processor 106.

In one configuration, the host computer 102 is a mobile device, such as a notebook computer, and is configured with the first graphics subsystem 108 and the mGPU 110. The enhanced graphics subsystem 104 is a docking system with the dGPU 114. In addition, the first display device 112 corresponds to the internal display panel of the notebook computer, while the second display device 116 is connected to the docking system.

In another configuration, the host computer 102 is a desktop system and is still configured with the first graphics subsystem 108 and the mGPU 110. The enhanced graphics subsystem 104 is an add-on system with the dGPU 114. Here, the first display device 112 corresponds to the display panel that is directly supported by the desktop system, while the second display device 116 corresponds to an external display device directly supported by the add-on system. It should be apparent to a person with ordinary skills in the art to recognize that the aforementioned multi-GPU systems can be implemented in many other configurations without exceeding the scope of the claimed invention.

Figure 2:
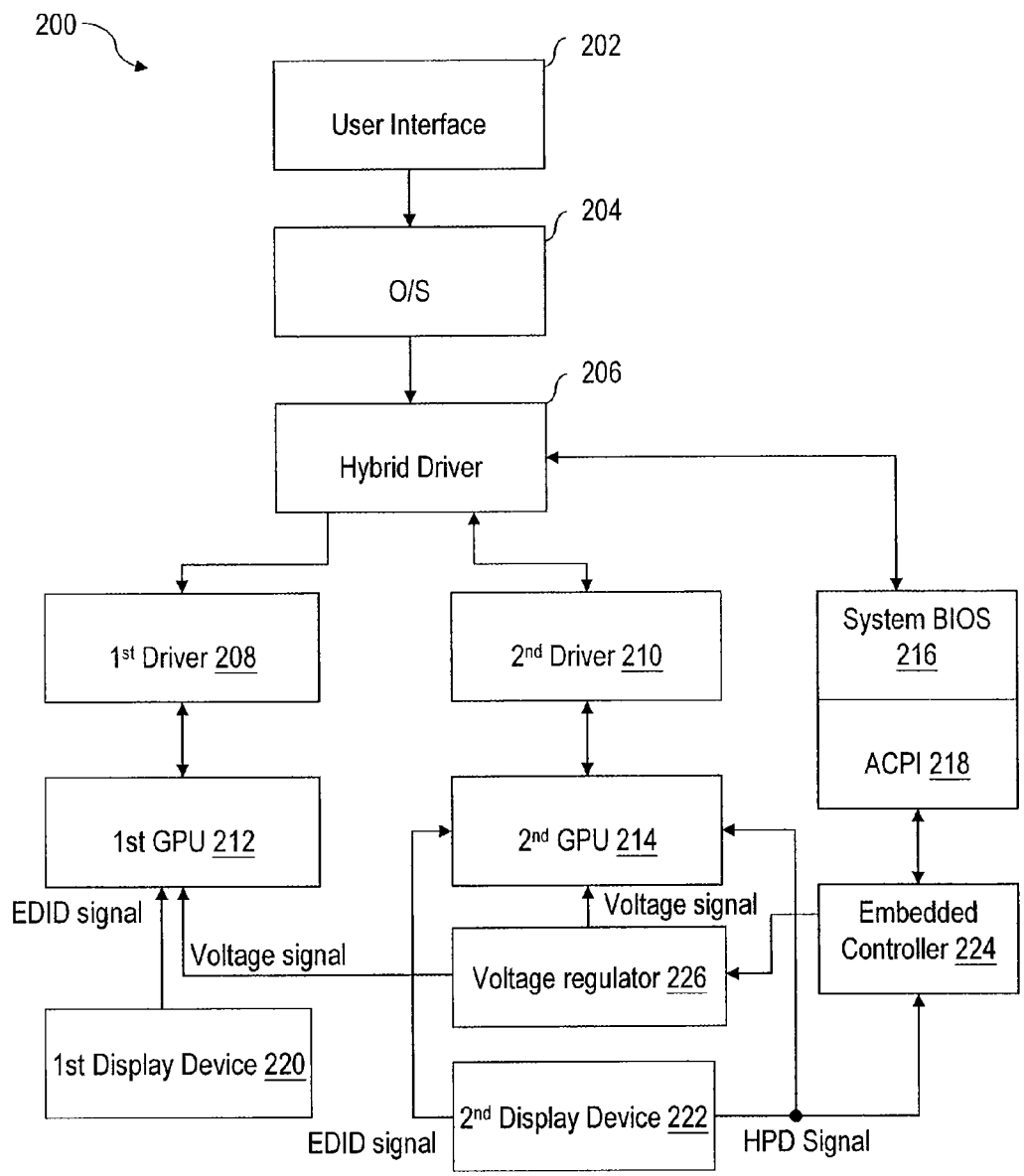
FIG. 2 is a software stack to be executed on a host computer of a multi-GPU system to provide seamless access to a display device attached to a dGPU, even if the dGPU is unavailable, by using hot-plug detection signals, according to one embodiment of the present invention.

FIG. 2 is a software stack 200 to be executed on the host computer 102 to provide seamless access to the second display device 116 attached to the second GPU 114, even if the second GPU 114 is unavailable, by using hot-plug detection signals, according to one embodiment of the present invention. The software stack 200 includes a user interface (UI) 202, an operating system (OS) 204, and a hybrid driver 206. The UI 202 operates on top of the OS 204, which here refers to the OS for the host computer 102 of FIG. 1. The software stack 200 further includes a first driver 208 and a second driver 210 for communicating with a first GPU 212 and a second GPU 214, respectively. The first GPU 212 may correspond to the first GPU 110 of FIG. 1, and the second GPU 214 may correspond to the second GPU 114. The hybrid driver 206 mainly wraps these two drivers so that they appear as a single driver to the OS 204. Moreover, the software stack 200 also includes a system BIOS 216 and an Advanced Configuration and Power Interface (ACPI) driver 218. The ACPI driver 218 obtains power management state information and maintains a list of all enumerated display devices that are supported by the multi-GPU system 100. The ACPI driver 218 interacts with the hybrid driver 206 and also an embedded controller 224, which may correspond to the embedded controller 120 of FIG. 1. The first GPU 212 is further connected to a first display device 220 (may correspond to the first display device 112) while the second GPU 214 is coupled to a second display device 222 (may correspond to the second display device 116).

Before discussing the operations of the software stack 200, it is worthwhile to first explain extended display identification data (EDID) and hot-plug detection (HPD) signals. EDID is a at least 128-byte data containing information such as manufacturer name, product type, phosphor or filter type, timings supported by the display device, display size, luminance data, and pixel mapping data. Generally, the EDID signal is stored in the display device and transmitted through an I-squared-C (I2C) data bus. The combination of the I2C data bus and the EDID signal itself is referred to as display data channel (DDC). In typical operations, the first GPU 212 is configured to receive the EDID signal of the first display device 220 while the second GPU 214 is configured to receive the EDID signal from the second display device 222. In one implementation, the first and second GPUs 212 and 214 receive the EDID signals at their respective GPIO ports. The received EDID signals are further transmitted through the layers of drivers to the OS 204, which then validates the display capabilities of the first and the second display devices 220 and 222 before possibly availing the display devices to be selected via the UI 202.

A HPD signal is generated when its corresponding plug-and-play device is added, changed, or removed. However, because the HPD signal is generally unreliable, this signal is sometimes deliberately suppressed. In one embodiment of the present invention, detecting the HPD signal associated with a particular display device triggers the retrieval of the EDID signal of the same display device. The EDID signal not only contains the needed display device configuration information as discussed above, but it also serves to verify the HPD signal and the presence of the display device. As shown in FIG. 2, the embedded controller 224 is configured to receive the various HPD signals associated with the second display device 222 via its GPIO port.

Figure 3:
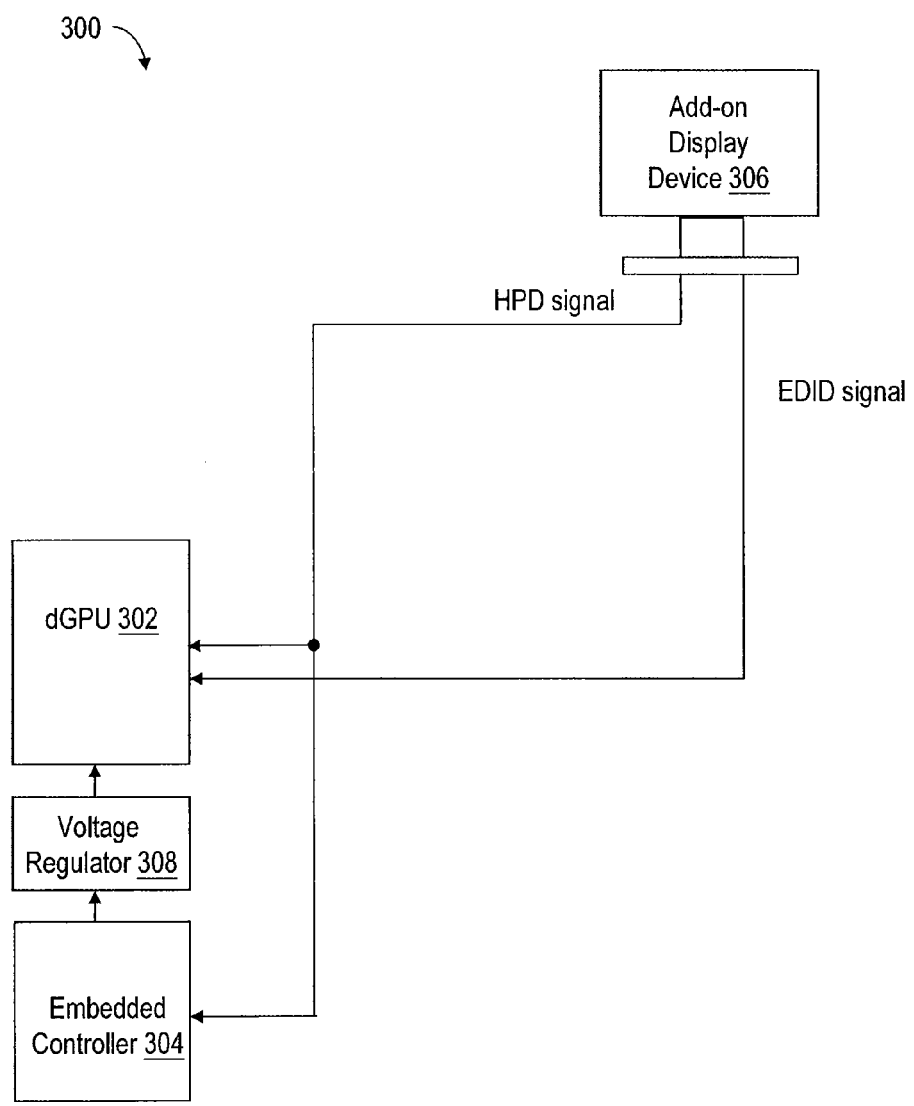
FIG. 3 is a simplified block diagram illustrating a part of a computer system configured to access an add-on display device utilizing the HPD signals associated with such a display device, according to one embodiment of the present invention.

FIG. 3 is a simplified block diagram illustrating a part of a computer system 300 configured to access an add-on display device 306 utilizing the HPD signals associated with such a display device, according to one embodiment of the present invention. The computer system 300 includes a dGPU 302, an embedded controller 304, and a voltage regulator 308, which may correspond to the second GPU 214, the embedded controller 224, and the voltage regulator 226 of FIG. 2, respectively.

After the HPD signal associated with the add-on display device 306 is generated, the embedded controller 304 triggers the voltage regulator 308 to output sufficient power to change the dGPU 302 from its initial power-down mode to a power-on mode. After the dGPU 302 is powered on and the associated graphics driver is loaded, the dGPU 302 retrieves the EDID signal of the add-on display device 306. In one implementation, the dGPU 302 is repeatedly powered on to check if there is any updated EDID signal associated with the add-on display device 306 to be fetched and powered down to conserve power consumption. In an alternative implementation, the EDID signal is fetched and cached, so that the dGPU 302 does not need to be powered on and off so frequently. It is important to note the configuration as shown in FIG. 3 requires minimal hardware modifications, because neither does the computer system 300 need to include additional multiplexers or demultiplexers nor do the signal paths carrying the configuration information of the add-on display device 306 need to be hard wired to the mGPU of the computer system 300.

Figure 4A:
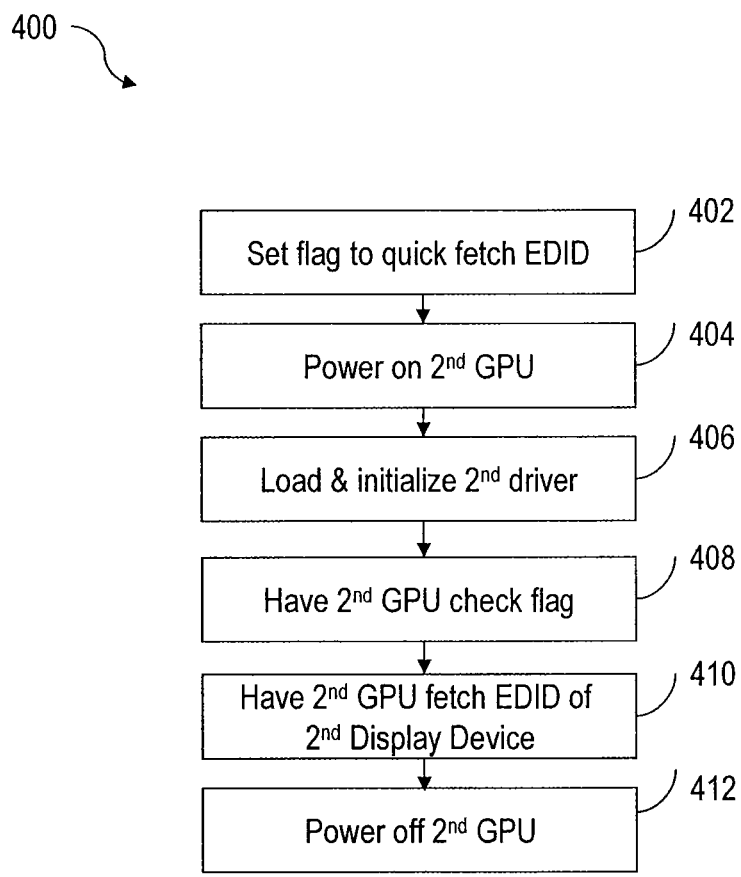
FIG. 4A is a flow chart illustrating a method of fetching the EDID signal of a second display device, according to one embodiment of the present invention.

In conjunction with the software stack 200 shown in FIG. 2, FIG. 4A is a flow chart illustrating a method 400 of fetching the EDID signal of the second display device 222, according to one embodiment of the present invention. After the hybrid driver 206 learns of the detection of a HPD signal associated with the second display device 222 from the embedded controller 224, in step 402, the hybrid driver 206 sets a flag of quick-fetching the EDID signal. After that flag is set, the hybrid driver 206 in step 404 causes the second GPU 214 to power on via the embedded controller 224. In step 406, the hybrid driver 206 loads and initializes the second driver 210. Then, the powered-on second GPU 214 verifies that the flag is indeed still set and the EDID signal needs to take place in step 408. Suppose the flag remains set. The second GPU 214 in step 410 fetches the EDID signal of the second display device 222 and returns it to the hybrid driver 206. After that, the hybrid driver 206 causes the second GPU 214 to power down in step 412.

Figure 4B:
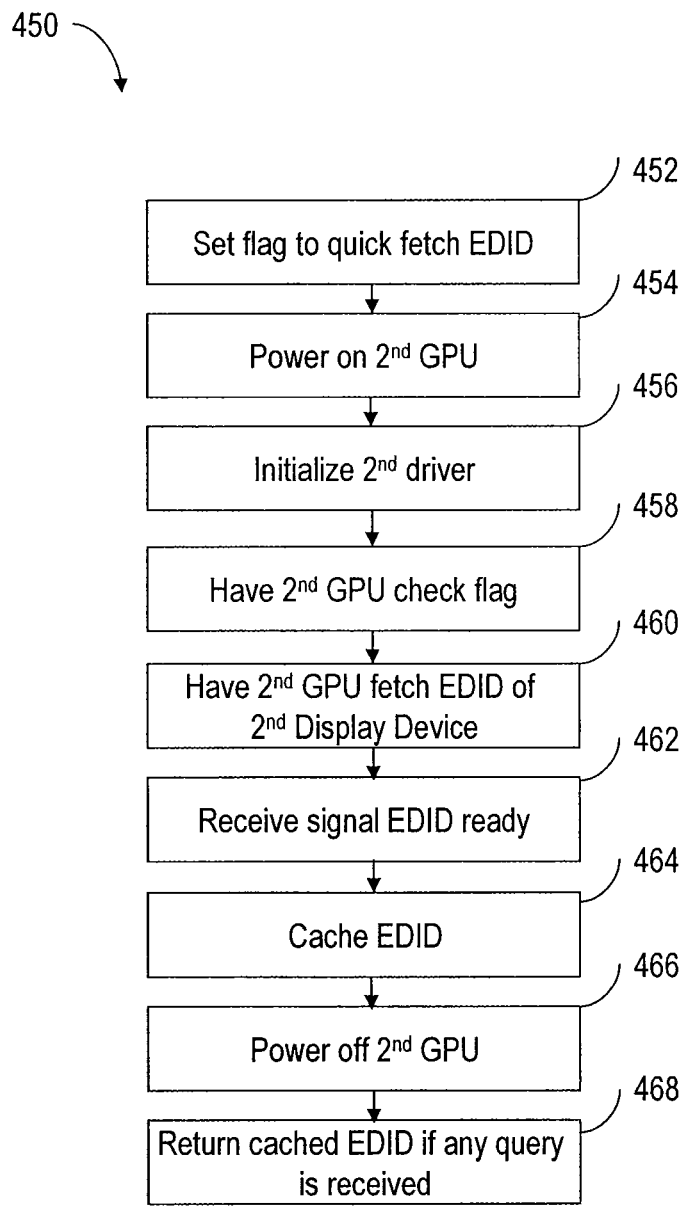
FIG. 4B is also a flow chart illustrating another method of fetching the EDID signal of the second display device, according to another embodiment of the present invention.

FIG. 4B is also a flow chart illustrating another method 450 of fetching the EDID signal of the second display device 222, according to another embodiment of the present invention. Similarly, after learning of the detection of a HPD signal associated with the second display device 222, the hybrid driver 206 also sets a flag of quick EDID fetching in step 452. In step 454, the hybrid driver 206 causes the second GPU 214 to power on via the embedded controller 224. Then, in step 456, the hybrid driver 206 loads and initializes the second driver 210 for the powered-on second GPU 214. The hybrid driver 206 in step 458 has the second GPU 214 check the quick EDID fetching flag. Assuming the flag remains set, in step 460, the hybrid driver 206 has the second GPU 214 fetch the EDID signal of the second display device 222. After having received a signal indicative of a successful fetching of the EDID signal of the second display device 222 in step 462, the hybrid controller 206 caches the fetched EDID signal in step 464. The hybrid driver 206 in step 466 causes the second GPU 214 to be powered off but responds to queries for the EDID signal of the second display device 222 by accessing the cached EDID signal in step 468. Compared with the method 400 of FIG. 4A, the method 450 of FIG. 4B does not require the second GPU 214 to be powered on and powered off repeatedly. The use of the cached EDID signal thus helps to improve power efficiency of the multi-GPU system. It is worth noting that only some parts of software for the hybrid driver 206 needs to be rewritten to implement the various features pertaining to the software stack 200 as described above. The software for the first driver 208 and the second driver 210, on the other hand, can remain essentially unchanged.

After the hybrid driver 206 relays the EDID signal to the OS 204, the OS 204 in one implementation further validates the capabilities of the display device based on the received EDID signal. In addition, the OS 204 can make use of the received EDID signal to confirm the presence of the second display device 222. For instance, the OS 204 can validate whether the HPD signal was in fact from a display attach event or a display detach event, or whether the signal was from an unrelated display bus event, such as a CEC or a HDCP event. A change in the EDID signal will confirm a display attach event or a display detach event and affect whether the hot-plug event should be reported to the operating system and applications. Suppose the capabilities and also the presence of the second display device 222 is verified to be supported by the host computer 102 of FIG. 1. The UI 202 then makes the second display device 222 available to the user.

The above description illustrates various embodiments of the present invention along with examples of how aspects of the present invention may be implemented. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, ROM chips, or any type of solid-state non-volatile semiconductor memory) on which information is permanently stored; and (ii) writable storage media (e.g., floppy disks within a diskette drive, CD-RW disks, DVD-RW disks, flash memory, hard-disk drive, or any type of solid-state random-access semiconductor memory) on which alterable information is stored. The above examples, embodiments, instruction semantics, and drawings should not be deemed to be the only embodiments, and are presented to illustrate the flexibility and advantages of the present invention as defined by the following claims.

We claim:

1. A method for obtaining an extended display identification data (EDID) signal associated with a display device in a multi-graphics-processing-unit (multi-GPU) system based on a hot-plug detection (HPD) signal also associated with the display device, the method comprising:
   learning, from an embedded controller, that the HPD signal has been generated;
   in response to learning of the HPD signal, setting a flag associated with fetching the EDID signal;
   after setting the flag, causing a discrete GPU (dGPU) that is coupled to the display device to power on;
   loading and initializing a driver corresponding to the powered-on dGPU;
   causing the powered-on dGPU to confirm that the flag is still set;
   causing the powered-on dGPU to obtain the EDID signal; and
   causing the powered-on dGPU to power off.

2. The method of claim 1, further comprising validating the EDID signal prior to availing the display device as an option to be selected.

3. The method of claim 2, wherein validating further comprises using the EDID signal to verify the presence of the display device prior to availing the display device as an option to be selected.

4. The method of claim 1, further comprising caching the EDID signal prior to causing the powered-on GPU to power off.

5. The method of claim 4, further comprising receiving a signal indicating that the EDID signal was successfully obtained prior to caching the EDID signal.

6. The method of claim 4, further comprising responding to a query for the EDID signal with the cached EDID signal instead of initiating another retrieval operation via the dGPU.

7. The method of claim 1, further comprising masking an event associated with detecting the assertion of the HPD signal so that the event is reported to an operating system and application software running on the multi-GPU system only after (i) obtaining the EDID signal and (ii) confirming-that the HPD signal was caused by a valid attach event or a detach event of the display device.

8. The method of claim 1, wherein causing the dGPU to power on comprises causing an embedded controller to trigger a voltage regulator to output sufficient power to change an operating state of the dGPU from a power-down mode to a power-on mode.

9. The method of claim 1, wherein, after the dGPU obtains the EDID signal, the dGPU is configured to return the EDID signal to a hybrid driver.

10. The method of claim 1, further comprising updating the EDID signal by periodically:
causing the powered-off dGPU to power on;
causing the powered-on dGPU to confirm that the flag is still set;
causing the powered-on dGPU to obtain the EDID signal; and
causing the powered-on dGPU to power off.

11. A non-transitory computer-readable medium containing a sequence of instructions that, when executed by a processor in a multi-graphics-processing-unit (multi-GPU) system, causes the processor to:
learn, from an embedded controller, that a hot-plug detection (HPD) signal has been generated;
in response to learning of the HPD signal, set a flag associated with fetching an extended display identification data (EDID) signal associated with a display device;
after setting the flag, cause a discrete GPU (dGPU) that is coupled to the display device to power on;
load and initialize a driver corresponding to the powered-on dGPU;
cause the powered-on dGPU to confirm that the flag is still set;
cause the powered-on dGPU to obtain the EDID signal; and
cause the powered-on dGPU to power off.

12. The non-transitory computer-readable medium of claim 11, further containing a sequence of instructions for the software stack that, when executed by the processor, causes the processor to cache the EDID signal prior to causing the powered-on GPU to power off.

13. The non-transitory computer-readable medium of claim 12, further containing a sequence of instructions for the software stack that, when executed by the processor, causes the processor to respond to a query for the EDID signal with the cached EDID signal instead of initiating another retrieval operation via the dGPU.

14. The non-transitory computer-readable medium of claim 12, further containing a sequence of instructions for the software stack that, when executed by the processor, causes the processor to receive a signal indicating that the EDID signal was successfully obtained prior to caching the EDID signal.

15. The non-transitory computer-readable medium of claim 11, wherein causing the dGPU to power on comprises causing an embedded controller to trigger a voltage regulator to output sufficient power to change an operating state of the dGPU from a power-down mode to a power-on mode.

16. The non-transitory computer-readable medium of claim 11, wherein, after the dGPU obtains the EDID signal, the dGPU is configured to return the EDID signal to a hybrid driver.

17. A multi-graphics-processing-unit (multi-GPU) system, comprising:
a host processor;
a first GPU coupled to the host processor;
a second GPU coupled to the host processor and to a display device; and
a system memory coupled to the host processor and storing at least a portion of a hybrid driver comprising a sequence of instructions that, when executed by the host processor, cause the host processor to:
learn, from an embedded controller, that a hot-plug detection (HPD) signal associated with the display device has been generated;
in response to learning of the HPD signal, set a flag associated with fetching an extended display identification data (EDID) signal associated with a display device;
after setting the flag, cause the second GPU to power on load and initialize a driver corresponding to the powered-on second GPU;
cause the powered-on second GPU to confirm that the flag is still set;
cause the powered-on second GPU to obtain the EDID signal; and
cause the powered-on second GPU to power off.

18. The multi-GPU system of claim 17, wherein causing the second GPU to power on comprises causing the embedded controller to trigger a voltage regulator to output sufficient power to change an operating state of the second GPU from a power-down mode to a power-on mode.

19. The multi-GPU system of claim 17, further comprising a voltage regulator that interacts with the embedded controller to power down the second GPU.

20. The multi-GPU system of claim 17, wherein the sequence of instruction includes instructions that, when executed by the host processor, cause the host processor to cache the EDID signal prior to causing the second GPU to be powered down.

21. The multi-GPU system of claim 20, wherein the sequence of instruction includes instructions that, when executed by the host processor, cause the host processor to respond to a query for the EDID signal with the cached EDID signal instead of initiating another retrieval operation via the second GPU.

* * * * *